UNITED STATES PATENT OFFICE.

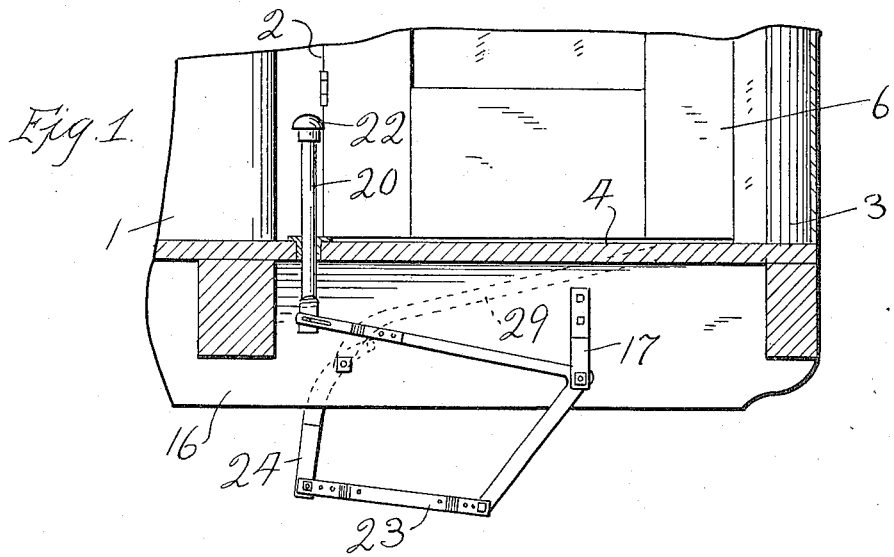
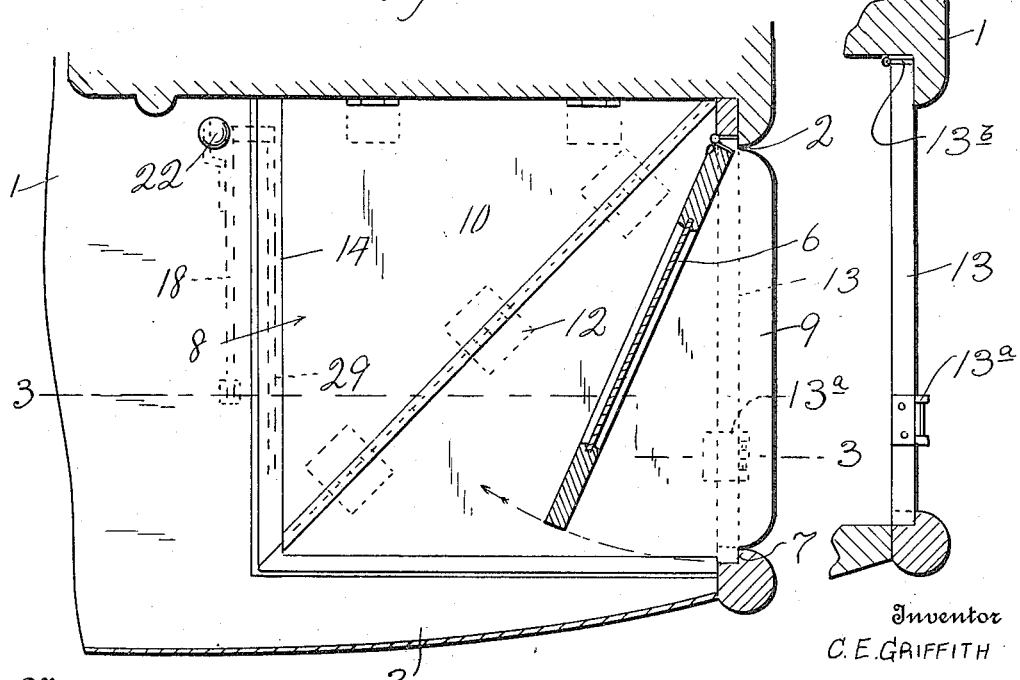

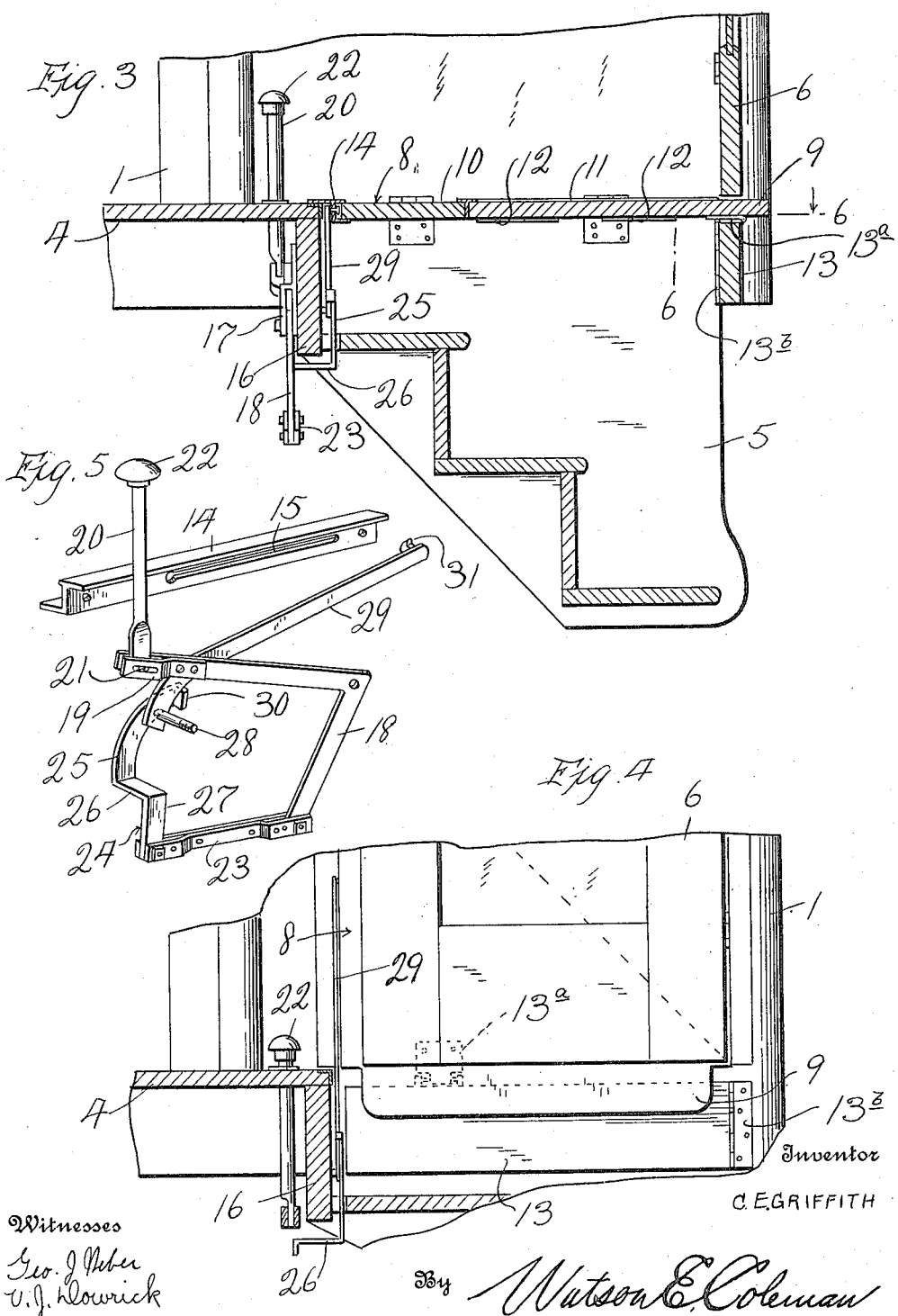

CHARLES E. GRIFFITH, OF PHILADELPHIA, PENNSYLVANIA.

CAR-VESTIBULE DOOR AND TRAP.

1,152,626.   Specification of Letters Patent.   Patented Sept. 7, 1915.

Application filed February 17, 1915. Serial No. 8,775.

*To all whom it may concern:*

Be it known that I, CHARLES E. GRIFFITH, a citizen of the United States, residing at Philadelphia, in the county of Philadelphia, and State of Pennsylvania, have invented certain new and useful Improvements in Car-Vestibule Doors and Traps, of which the following is a specification, reference being had to the accompanying drawings.

This invention relates to new and useful improvements in car vestibule doors and traps and more particularly to an improvement on my former Patent Number 876,871 and issued January 14th, 1908 and the primary object of the invention is to provide an improved trap which, when folded to its inoperative position, is disposed in the rear of the vestibule door of the car and out of possible contact with the garments of the passengers making their exit from and entrance to the vestibule.

Still another object of the invention resides in providing a trap which is operable independently of the vestibule door and a still further object resides in providing a trap which is diagonally divided into sections and hinged one to the other.

A further object of the invention resides in providing a device which is adapted for use in connection with either high or low platforms of stations, whereby in connection with the former, the use of the steps may be omitted.

A still further object of the invention resides in providing a device which is simple and durable in construction, inexpensive to manufacture and one which will be very efficient and useful in operation.

With these and other objects in view, the invention consists in the novel features of construction, combination and arrangement of parts as will be hereinafter referred to and more particularly pointed out in the specification and claims.

In the accompanying drawings forming a part of this application, Figure 1 is a longitudinal section through the end of a car equipped with a vestibule and trap constructed in accordance with my invention. Fig. 2 is a horizontal section therethrough showing the door in a partially open position and the trap in its closed position. Fig. 3 is a transverse section as seen on line 3—3, of Fig. 2, with the door shown in its closed position. Fig. 4 is a transverse section through the device showing the door and trap in their open and inoperative positions. Fig. 5 is an enlarged detail perspective view of the trap operating mechanism; and Fig. 6 is a horizontal section as seen on line 6—6 of Fig. 3.

In describing my invention, I shall refer to the drawings in which similar reference characters designate corresponding parts throughout the several views, and in which—

1 indicates a portion of a railway car having a door opening 2 at one end thereof, which affords means of entrance to and exit from the vestibule portion 3 of the car. The platform 4 of the car forming the floor of the vestibule has the steps 5 secured thereto in the usual or any preferred manner and my invention primarily contemplates the provision of a trap for covering these steps and designed to form a continuation of the platform.

Hinged to the body of the car on one side of the door-way 2 and in the customary manner, is the vestibule door 6, the opposite frame of the door-way being grooved, as shown at 7 to receive the free vertical edge of said door when the latter is disposed to its closed position.

Hinged to the body of the car, forming the side wall of the vestibule, adjacent the hinged end of the door 6, and foldable upwardly is a trap 8, which is substantially square in plan having a flange-like projection 9 formed on one edge thereof, said projection being of less length than one side of the substantially square trap proper. This trap 8 is diagonally divided into sections, indicated as 10 and 11, respectively, said sections being hinged one to the other, through the medium of the hinges 12 to permit said sections to fold inwardly and downwardly toward one another. The outer side edge of the section 11 upon which the flange-like projection is formed, has a sill 13 hinged thereto, through the medium of the hinge 13$^a$, and the one end of said sill is hinged through the medium of the hinge 13$^b$ to the car on one side of the doorway, slightly below said door 6. The lower edge of the door 6 is, as shown and described, spaced slightly above the upper edge of the sill 13, permitting the outer side edge of the platform to project therebetween and the outer side edge of the flange 9 extends to the plane of the outer face of the wall of the car when said trap is lowered to its closed position, as clearly shown in Figs. 2 and 3 of the drawings.

Secured to the inner side edge of the obliquely divided trap 8 and extending the full length thereof, is the angular plate or bar 14, a portion of which is adapted to rest in contact with the upper face of the platform 4, at the outer edge of the latter, thereby affording a support for the inner edge of the trap when the latter is disposed to its operative and closed position. The vertical portion of the angular plate or bar 14 is provided with a longitudinal slot 15, the purpose of which will be presently set forth.

To the timber which is indicated as 16, which extends longitudinally of the car below the platform 4 and to which the steps 5 are attached, is secured a bracket 17, to which the angle of an angle or bell crank lever 18 is fulcrumed. The arms of this lever are of unequal length and the longer arm which is the upper arm thereof extends rearwardly and upwardly at an inclination, having its free end bifurcated as shown at 19 and straddling the lower end of a depression rod 20, which rod extends through an opening in the platform 4. The lower end of said rod is provided with pins 21 which enter slots in the furcations of the bifurcated end 19 of the angle lever, thereby providing a loose connection therebetween. The upper end of the depression rod 20 is provided with a knob or head 22 which may be readily engaged by the foot or hand to facilitate the depression thereof. The lower or shorter arm of the angle lever 18 is pivoted to the forward end of a connecting bar 23, the rear end of said bar being connected to a lever, such as that denoted in a general way by the numeral 24, the latter being disposed directly under the rod 20.

The lever 24 consists of an upper portion indicated as 25, a transversely disposed horizontal portion 26 formed by a distortion in the lever and a lower portion 27, all formed in one piece. The horizontally disposed transverse portion 26 is located under the timber 16 and the upper portion 25 is disposed approximately to one side of said timber while the lower portion 27 is located approximately in a plane on the opposite side of said timber. The pivot for said lever 24 is disposed near the upper end thereof and consists of a pin 28 sustained by the timber 16 and the same pin also serves as a center for an additional lever 29. This additional lever has a curved inner portion which bears against a laterally disposed lug or projection 30 formed at the upper end of said lever 24. The outer end of the lever 29 has a projection 31 formed thereon which is designed to slide in the slot 15 of the aforesaid angular plate or bar 14. From this construction, it will be seen that upon the depression of the rod 20, the levers will be actuated to fold the sections of the trap 8 together and force the same upwardly in a raised position against the wall of the vestibule adjacent the hinged end of the door 6.

In operation, assuming that the trap and door are in their closed positions, should it be desired to open the vestibule door to permit entrance to or exit from the vestibule, the door is opened as any ordinary door. This is in the case of high platforms, wherein the trap which forms a partial floor for the vestibule will be substantially flush with the platform for entrance to and exit from the vestibule. Under such conditions, the trap remains perfectly flat in its closed position. When reaching a low platform, however, and it is desired to permit passengers to make their entrance to and exit from the vestibule, the rod 20 is first depressed by the foot, which depression causes the lever 29 to be so actuated as to slide the projection 31 in the slot 15 of the angular plate or bar 14. Upon such action, the tendency will be to force the inner section 10 of the trap 8 to a raised position and in so doing, the outer section 11 will be withdrawn from its position below the door 6 and folded against the under face of said section 10. When the folded sections 10 and 11 have reached their full raised positions against the wall of the vestibule, the same are adapted to be retained in such position by a catch of any preferred form (not shown) on the wall of the vestibule. The door 6 is then adapted to be opened, it being noted that the latter is actuated entirely independent of the trap and when said door is opened, the same is adapted to be also engaged with a catch (not shown) in the wall of the vestibule. The door, when swung to its open position, will hide from view the folded trap 8 and prevent any contact of the apparel of the passengers upon the entrance of said passengers to and exit from the vestibule. From this description of the manner in which the trap and door are operated to dispose the same to their open positions, the manner in which the same should be actuated to fold the same, will be readily understood.

From the foregoing it will be seen that I have provided a simple, inexpensive and efficient means for carrying out the objects of the invention and while I have particularly described the elements best adapted to perform the functions set forth, it is obvious that various changes in form, proportion and in the minor details of construction may be resorted to without departing from the spirit or sacrificing any of the principles of the invention.

Having thus described this invention, what I claim is:—

1. In a railway car, the combination with a vestibule door; of a trap for the steps of the car formed of sections hinged one to the other along a line extending obliquely thereto, one section of said trap being hinged to the car adjacent the inner end of the door and the other section being adapted to project under said door and to the plane of the outer wall of the car when said trap and door are disposed to their closed positions.

2. In a railway car, the combination with a vestibule door; of a trap for the steps of the car formed of sections hinged one to the other along a line extending obliquely thereto, one section of said trap being hinged to the car adjacent the inner end of the door; the outer end of the other section of the trap being adapted to project under the lower edge of said door when the trap and door are disposed to their closed positions, and a sill hinged at its one end to the car below the inner end of the door and hinged adjacent its outer end to the under face of the last mentioned section of the trap adjacent the outer side edge thereof.

3. In a railway car, the combination with a vestibule door; of a trap for the steps of the car formed of a pair of sections hinged one to the other along a line extending obliquely thereto, one section of said trap being hinged to the car adjacent the inner end of the door, the outer side edge of the other section of the trap being adapted to project under the lower edge of said door when the trap and door are disposed to their closed positions, and a sill hinged on a vertical axis to the car below the inner end of the door and also hinged adjacent its outer end on a horizontal axis to the under face of the last mentioned section of the trap at a point adjacent the outer side edge of the latter.

4. In a railway car, the combination with a vestibule door; of a trap for the steps of the car formed of sections hinged one to the other along a line extending obliquely thereto, one section of said trap being hinged to the car adjacent the inner end of the door, the outer side edge of the other section of the trap being adapted to be disposed below the lower edge of said door when the latter and said trap are disposed to their closed positions, a flange formed on the outer side edge of the last mentioned section of the trap to project to the plane of the outer wall of the car when said trap is disposed to its closed position, and a sill hinged at its one end to the car below the inner end of the door and also hinged adjacent its opposite end to the under face of the last mentioned section of the trap at a point adjacent the outer side edge of the latter.

5. In a railway car, the combination with a vestibule and door thereof, of a trap for the steps of the car, said trap including two hingedly united sections, one of said sections being hinged to the wall of the car, a supporting sill for the outer end of the trap, said sill being hinged at one terminal to the wall of the car and being also hinged at its upper edge to the other section of the trap, and means connected to the first mentioned section for swinging the trap into open position, said second mentioned section being adapted to fall by gravity into folded position against the first mentioned section and the sill being adapted to swing into folded position against the wall of the car, when the trap is moved to open position.

In testimony whereof I hereunto affix my signature in the presence of two witnesses.

CHARLES E. GRIFFITH.

Witnesses:
RICHARD TAYLOR,
WILLIAM E. STOREY.